(No Model.)
J. B. MAHAFFEY.
APPARATUS FOR SEPARATING DUST FROM SHAVINGS.
No. 306,938. Patented Oct. 21, 1884.
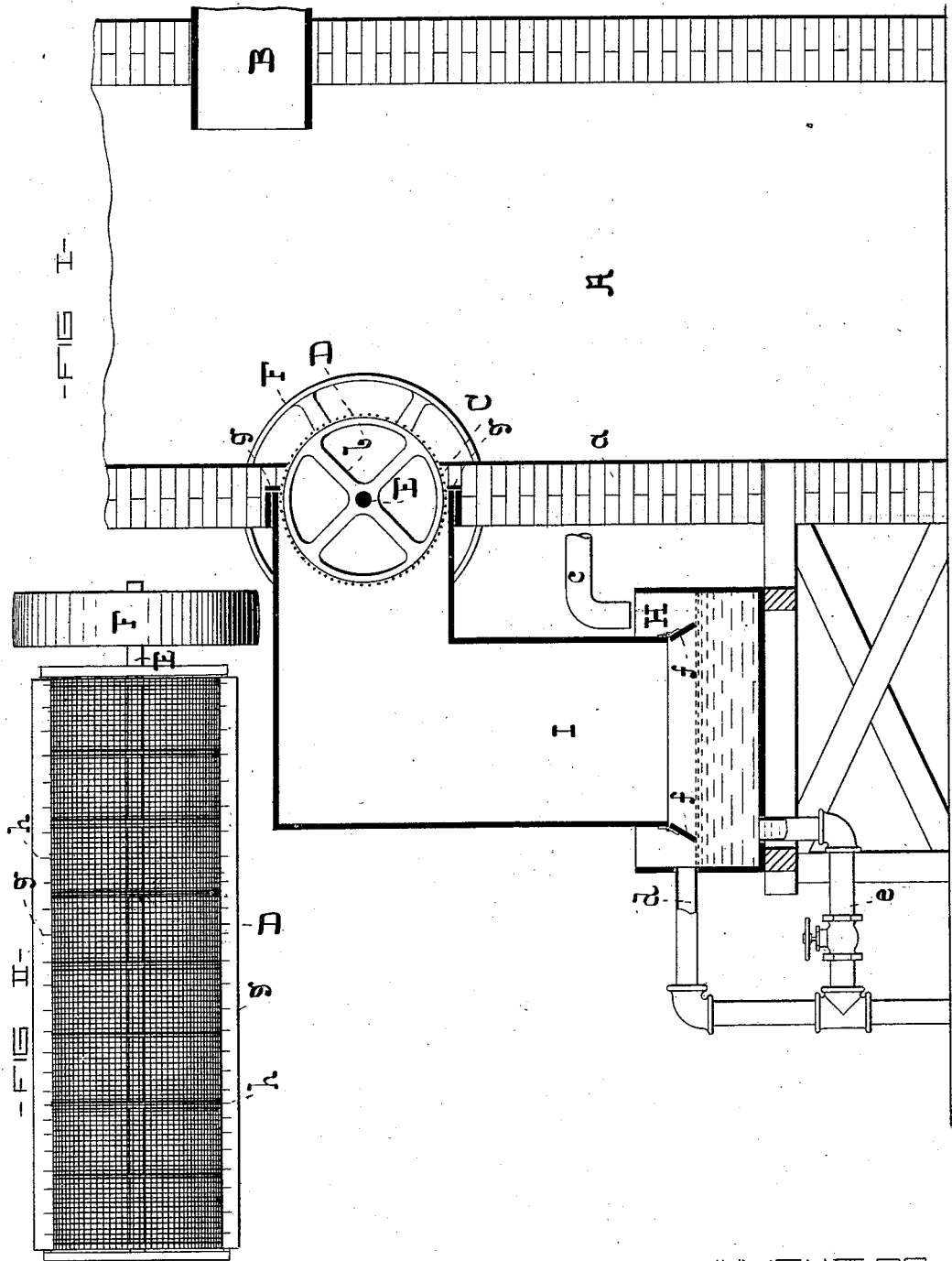

UNITED STATES PATENT OFFICE.

JAMES B. MAHAFFEY, OF BALTIMORE, MARYLAND.

APPARATUS FOR SEPARATING DUST FROM SHAVINGS.

SPECIFICATION forming part of Letters Patent No. 306,938, dated October 21, 1884.

Application filed July 28, 1884. (No model.)

*To all whom it may concern:*

Be it known that I, JAMES B. MAHAFFEY, of the city of Baltimore, and State of Maryland, have invented certain Improvements in an Apparatus for Separating Dust from Shavings, of which the following is a specification.

In sash, door, and other wood-working factories there is generally provided a room where shavings are collected and stored, and the shavings are usually conducted to the said room by means of an air-forcing fan and suitable pipes. Now, as shavings cannot be carried by pneumatic means to a tight or close chamber, it naturally follows that the dust and lighter portion of the shavings escape through the exit-aperture for the air and permeate the entire building to the great annoyance and discomfort of the operatives. My invention is designed to filter the escaping air and collect the dust in such condition as will admit of its being easily removed.

In the description of my invention which follows reference is made to the accompanying drawings, forming a part hereof, and in which—

Figure I is a vertical section of a storage-room for shavings provided with my improvements. Fig. II is an exterior side view of a part of the apparatus.

A is the shavings-room, and B the pipe through which shavings are delivered to the room.

C is an aperture in the wall *a* for the escape of air from the room A.

D is a cylindrical sieve situated in the aperture C, having an interior frame-work, *b*, which is secured to the revoluble shaft E. This shaft is supported in suitable bearings, not shown, and is driven by means of a pulley, F, and a belt.

H is a tub or vat containing water, which is supplied through a pipe, *c*. A common level of the water is maintained by means of an overflow-pipe, *d*, and the water may be drawn off, when necessary, through a pipe, *e*.

I is a chute leading from the aperture C to the tub H, and it has hinged doors *f*, which rest on the surface of the water in the tub, and rise and fall should the water-level be suddenly changed. The dust and light shavings are carried by the escaping air to the aperture C, where the coarser particles are intercepted by the revolving cylindrical sieve D. The dust passes through the sieve D and is mixed with the water in the tub H. The intercepted shavings are swept from the surface of the revolving cylindrical sieve D by means of strips of rubber or leather *g*, fastened in the aperture C. These strips are notched, as shown at *h*, to increase their flexibility. Fresh water is constantly supplied to the tub H, consequently the dust does not accumulate therein, but is carried off with the overflow-water.

In cases where it is inconvenient to employ water in a tub to receive the dust, the dust may be forced through a pipe directly to the boiler-furnace and consumed.

I claim as my invention—

1. In combination with a room for storing shavings, having a shavings-delivery pipe and an exit-aperture for air, a revoluble cylindrical sieve situated within the said aperture to intercept shavings, and a chute or pipe to carry off dust which passes through the said sieve, substantially as specified.

2. In combination with a room for storing shavings, having a shavings-delivery pipe and air-exit aperture, a revoluble cylindrical sieve situated within the said aperture to intercept shavings, a chute to carry off dust which passes through the said sieve, and a water-holding tub to receive the dust as it escapes from the chute, substantially as specified.

3. In combination with a room for storing shavings, having a shavings-delivery pipe and an air-exit aperture, a revoluble cylindrical sieve situated within the said aperture to intercept shavings, a chute to carry off dust which passes through the said sieve, and a water-holding tub to receive the dust having suitable supply and overflow water-pipes, substantially as specified.

4. In combination with a room for storing shavings, having a shavings-delivery pipe and an air-exit aperture in which is situated a revoluble cylindrical sieve, flexible strips arranged within the said air-exit aperture adapted to rest on the circumference of the sieve and to remove the shavings therefrom during the revolution of the sieve, substantially as specified.

JAMES B. MAHAFFEY.

Witnesses:
  CHAS. B. CASSADY,
  DANL. FISHER.